(12) United States Patent
Salim et al.

(10) Patent No.: US 11,984,986 B2
(45) Date of Patent: May 14, 2024

(54) UPLINK HARQ IN CELLULAR WIRELESS COMMUNICATION NETWORKS

(71) Applicant: JRD COMMUNICATION (SHENZHEN) LTD., Guangdong (CN)

(72) Inventors: Umer Salim, Guangdong (CN); Trung Kien Le, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 507 days.

(21) Appl. No.: 17/417,016

(22) PCT Filed: Dec. 9, 2019

(86) PCT No.: PCT/CN2019/124055
§ 371 (c)(1),
(2) Date: Jun. 21, 2021

(87) PCT Pub. No.: WO2020/125473
PCT Pub. Date: Jun. 25, 2020

(65) Prior Publication Data
US 2022/0077963 A1    Mar. 10, 2022

(30) Foreign Application Priority Data
Dec. 21, 2018    (GB) ..................................... 1821058

(51) Int. Cl.
*H04L 1/1812*    (2023.01)
*H04L 5/00*    (2006.01)
*H04W 72/23*    (2023.01)

(52) U.S. Cl.
CPC .......... *H04L 1/1812* (2013.01); *H04L 5/0055* (2013.01); *H04W 72/23* (2023.01)

(58) Field of Classification Search
CPC ... H04L 1/1812; H04L 5/0055; H04L 1/1671; H04L 1/08; H04L 1/1822; H04L 1/1825;
(Continued)

(56) References Cited

U.S. PATENT DOCUMENTS

| 2018/0123765 A1 | 5/2018 | Cao et al. |
| 2018/0295651 A1 | 10/2018 | Cao et al. |
| 2019/0132824 A1* | 5/2019 | Jeon ...................... H04L 5/0092 |

FOREIGN PATENT DOCUMENTS

| CN | 108365924 A | 8/2018 |
| WO | 2018/130183 A1 | 7/2018 |
| WO | 2020/033718 A1 | 2/2020 |

OTHER PUBLICATIONS

3rd Generation Partnership Project; Technical Specification Group Radio Access Network; NR; Medium Access Control (MAC) protocol specification (Release 16); 3GPP TS 38.321, V16.7.0, section 5.8.2, 2021.

(Continued)

*Primary Examiner* — Charles N Appiah
*Assistant Examiner* — Frank E Donado
(74) *Attorney, Agent, or Firm* — PV IP PC; Wei Te Chung; Zhigang Ma (57) ABSTRACT

Methods and systems for management of uplink HARQ processes where fewer than a defined number of repetitions of uplink data are transmitted on configured grant resources. The applied HARQ processes may be varied dependent on the number of repetitions transmitted and dependent on the reception status at the base station.

20 Claims, 6 Drawing Sheets

(58) Field of Classification Search
CPC ...... H04L 1/189; H04L 1/1816; H04W 72/23; H04W 72/04; H04W 72/20
See application file for complete search history.

(56) References Cited

OTHER PUBLICATIONS

"On Configured Grant enhancements for NR URLLC", Nokia, 3GPP TSG RAN WG1 Meeting #95, R1-1813118, 2018.
"On NR URLLC enhancements for grant-free transmission", Panasonic, 3GPP TSG RAN WG1 Meeting #95, R1-1812797, 2018.
"Offline summary for AI 7.3.3.4 UL data transmission procedure", NTT DOCOMO, Inc., 3GPP TSG RAN WG1 Meeting #91, R1-1721510, Dec. 1, 2017.
"UL data transmission without UL grant", NTT DOCOMO, Inc., 3GPP TSG RAN WG1 Meeting NR Ad-Hoc#3, R1-1716107, Sep. 21, 2017.
"Enhanced UL configured grant transmissions", Huawei, HiSilicon, 3GPP TSG RAN WG1 Meeting #95, R1-1812226, Nov. 16, 2016.
"Reliability enhancement for grant-free transmission", Huawei, HiSilicon, 3GPP TSG RAN WG1 Meeting #92bis, R1-1804296, Apr. 20, 2018.

\* cited by examiner

UPLINK HARQ IN CELLULAR WIRELESS COMMUNICATION NETWORKS

CROSS-REFERENCE TO RELATED APPLICATIONS

This application is a National Stage of International patent application PCT/CN2019/124055, filed on Dec. 9, 2019, which claims priority to foreign Great Britain patent application No. GB 1821058.3, filed on Dec. 21, 2018, the disclosures of which are incorporated by reference in their entirety.

TECHNICAL FIELD

The following disclosure relates to transmission strategies for uplink configured-grant transmissions, and in particular to HARQ strategies for such transmissions.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of $10^{-5}$ or $10^{-6}$ has been proposed.

In contrast to URLLC and mMTC services, mobile broadband services such as eMBB (enhanced Mobile Broad Band) aim to provide high capacity data services to UEs, but with less-strict latency and reliability requirements. eMBB services can consume large amounts of transmission resources to provide the required service which has consequences for the provision of other services, particularly those with stringent latency requirements.

In order to improve latency, URLLC and mMTC protocols may use a configured-grant system (also known as grant-free transmission). In such systems transmission resources are configured for use by one or more UEs on a static or semi-static basis. The UEs may then use those configured grant resources at their discretion without having to transmit a scheduling request and waiting to be allocated resources.

Configured-grant resources may be allocated to allow repetition of transport blocks which may be required to improve channel quality. The configured-grant configuration may specify the number of repetitions (repK), and the sequence of redundancy versions (RV) for those transmissions (repK-RV). These parameters may be transmitted to a UE with the configured-grant configuration in higher-layer (RRC) signalling.

Figure 1:
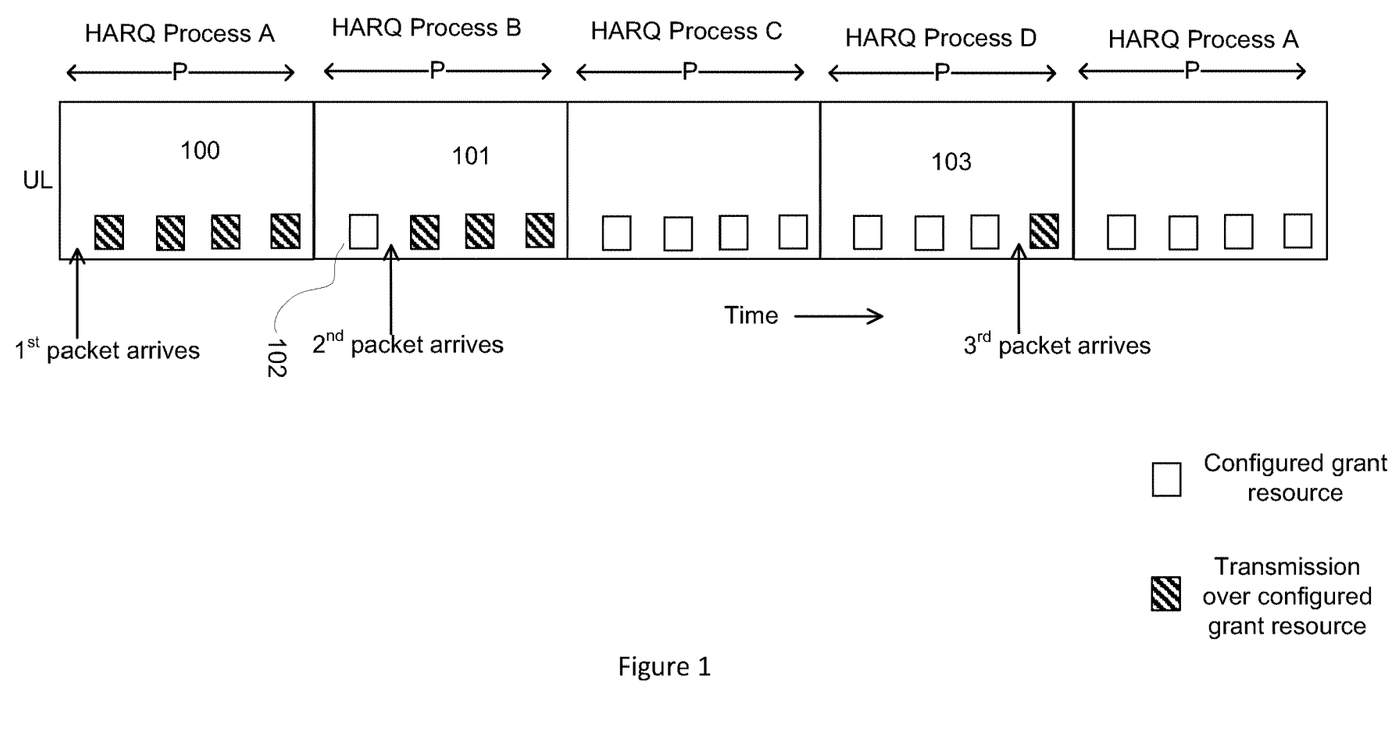
FIGS. 1 and 2 show an example transmission format for configured-grant uplink transmissions.

As shown in FIG. 1, configured-grant resources are assigned in a periodic fashion. In this figure, the periodicity of transmissions is denoted by "P". Thus P denotes the Periodicity for UL transmission without UL grant for type 1 and type 2. It corresponds to Layer1 parameter 'UL-TWG-periodicity' (see 3GPP TS 38.321, section 5.8.2). The user can send a new packet in each configured grant period. Each period is associated to a particular HARQ process number or ID, which start repeating in a circular fashion. The users can be configured with a configured grant periodicity of as low as few OFDM symbols to multiple slots to suit the application requirements. Each period of configured grant is configured with a suitable number of transmission occasions. The valid configurations are the ones with the number of transmission occasions equal to or larger than the number of repetitions configured (repK). In the example of FIG. 1 each period comprises 4 configured-grant transmission occasions. The UE can transmit one repetition of a transport block in each occasion.

In the example of FIG. 1, repK is also set to 4. In the first period 100 a packet is received at the start of the period and the UE can make the four repetitions within the period 100. However, in the second period 101 a packet is received after the first transmission occasion 102. Only three transmission occasions thus remain in the period 101 and the UE can only make three repetitions within that period 101. Repetitions of a transport block must all be transmitted within one period due to association with HARQ process and hence the UE is unable to transmit the fourth repetition. Similarly, in period 103 a packet is received with only one transmission occasion remaining in the period 103 and hence the UE can only transmit one repetition.

The opportunities to transmit may further be reduced than the examples of FIG. 1 for certain RV sequences like {0, 2, 3, 1} and {0, 3, 0, 3} due to restriction that the first repetition transmitted should have RV 0.

The reduced number of repetitions will reduce the effective signal energy for a transport block, reduced channel diversity and hence increase the probability of failed decoding at the base station. If the base station is able to identify the UE which made the transmission a retransmission request can be sent (for example, an UL grant with the relevant HARQ ID for the process, and new data information (NDI) set to zero). The UE will then re-transmit the transport block on the indicated resources, albeit this introduces extra latency into the transmission.

Configured-grant services often use a timer-based HARQ procedure in which the UE assumes a transmission is successfully received if a re-transmission request is not received within a certain time. This is an efficient process with low latency where the channel conditions are good as in most cases no HARQ feedback is required. However, in the example above, the reduced number of repetitions may mean a base station cannot even identify the UE which made a transmission. In such a situation the base station cannot transmit a retransmission request. The UE will assume the transport block was successfully received and will ultimately discard the data which will be lost.

Figure 2:
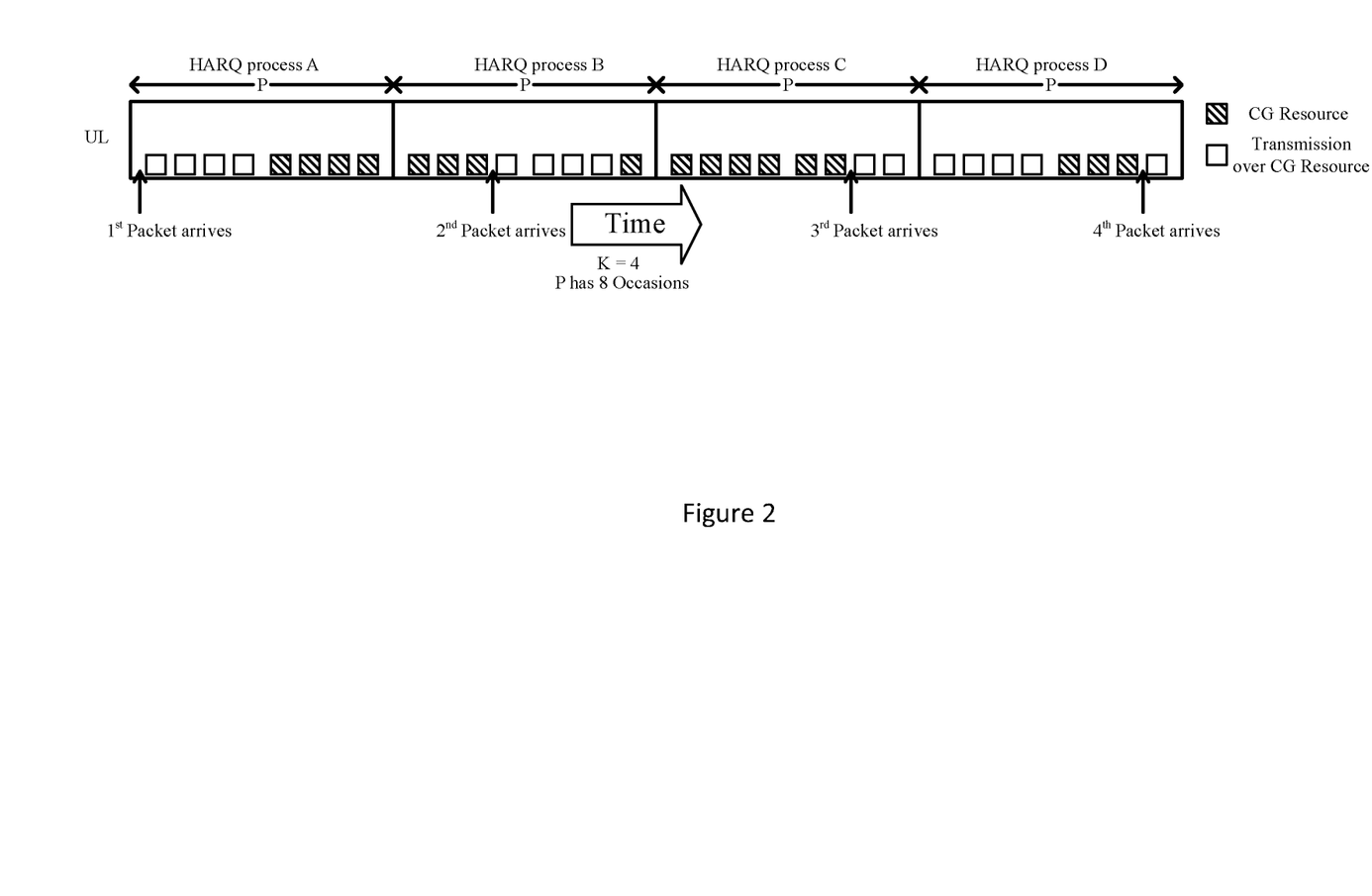

In the example of FIG. 1, the number of repetitions (K) was equal to the number of occasions in each period. The number of transmission occasions in a period P is denoted by N. However, this is an example only and N may be larger than K. For example, FIG. 2 shows a configured in which N equals 8 and K is 4. Assuming a uniform packet arrival of (1/N) in each interval between each transmission occasion, the problem highlighted above will occur for packets which arrive for transmission during the last (K−1) intervals. The problem thus occurs with a probability of (K−1)/N. The occurrence of packets transmitted with less than K repetitions may thus be reduced by increasing N, but this may negatively impact overall latency as only one packet can be transmitted in each period of N transmission occasions.

There is therefore a requirement for an improved technique for transmission of transport blocks which cannot be transmitted with the configured number of repetitions. As described earlier, this may happen due to a combination of reasons e.g., late packet arrival in a period P, configuration for a certain RV sequence which can be started on certain occasions but not all, and inability to wait for the next period due to latency constraints, etc.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method for uplink transmission on configured grant resources in a cellular wireless communications network, comprising the steps of at a base station allocating recurring uplink transmission resources to a UE, wherein the allocated recurring uplink transmission resources are grouped with N occasions in each of a repeating period P, and defining a number of repetitions K to be used for the uplink transmission of transport blocks in the recurring uplink transmission resources; transmitting an indication of the allocated recurring uplink transmission resources, K, and N to the UE; at the UE transmitting repetitions of a transport block within a single one of the periods P, each repetition being transmitted on an occasion of the N occasions in the period P; at the UE, if the number of transmitted repetitions is less than K applying an explicit HARQ feedback process, and if the number of transmitted repetitions is K applying a timer-based HARQ process; and at the base station if the number of received repetitions is less than K, and the transport block is successfully decoded, transmitting a positive HARQ acknowledgment; if the number of received repetitions is less than K, the transport block is not successfully decoded, and the UE can be identified, transmitting a negative HARQ indication; and if the number of received repetitions is K, and the transport block is successfully decoded, not transmitting a HARQ acknowledgement; and if the number of received repetitions is K, and the transport block is not successfully decoded, transmitting an UL grant for re-transmission.

There is also provided a method for uplink transmission on configured grant resources in a cellular wireless communications network, the method performed at a base station and comprising the steps of allocating recurring uplink transmission resources to a UE, wherein the allocated recurring uplink transmission resources are grouped with N occasions in each of a repeating period P, and defining a number of repetitions K to be used for the uplink transmission of transport blocks in the recurring uplink transmission resources; transmitting an indication of the allocated recurring uplink transmission resources, K, and N to the UE; if a number of received repetitions of a transport block is less than K, and the transport block is successfully decoded, transmitting a positive HARQ acknowledgment; if the number of received repetitions is less than K, the transport block is not successfully decoded, and the UE can be identified, transmitting a negative HARQ indication; if the number of received repetitions is K, and the transport block is successfully decoded, not transmitting a HARQ acknowledgement; and if the number of received repetitions is K, and the transport block is not successfully decoded, transmitting an UL grant for re-transmission.

The negative HARQ acknowledgement may be an UL grant indicating resources to be used for a retransmission of the transport block.

The method may further comprise the step of retransmitting the transport block from the UE to the base station using the indicated resources.

The negative HARQ acknowledgement may include the HARQ ID of the transport block.

The negative HARQ indication may only be transmitted if the number of transmitted repetitions is less than a predefined threshold.

The predefined threshold may be defined relative to K.

The negative HARQ indication may only be transmitted if the channel quality is estimated to be below a predefined threshold.

There is also provided a method for uplink transmission on configured grant resources in a cellular wireless communications network, the method performed at a UE and comprising the steps of receiving an indication of allocated recurring uplink transmission resources, wherein the allocated recurring uplink transmission resources are grouped with N occasions in each of a repeating period P, and a number of repetitions K to be used for the uplink transmission of transport blocks in the recurring uplink transmission resources; transmitting repetitions of a transport block within a single one of the periods P, each repetition being transmitted on an occasion of the N occasions in the period P; if the number of transmitted repetitions is less than K applying an explicit HARQ feedback process, and if the number of transmitted repetitions is K applying a timer-based HARQ process.

If less than K repetitions were transmitted, and no explicit HARQ feedback is received, the transport block may be retransmitted on subsequent configured grant resources.

If less than K repetitions were transmitted, and a negative HARQ feedback is received, the transport block may be retransmitted on transmission resources indicated in the negative HARQ feedback.

The explicit HARQ feedback process may only be applied if the number of transmitted repetitions is less than a predefined threshold.

The predefined threshold may be defined relative to K.

The explicit HARQ feedback process may only be applied if the channel quality is estimated to be below a predefined threshold.

There is also provided a method for uplink transmission on configured grant resources in a cellular wireless communications network, the method performed at a UE and comprising the steps of receiving an indication of allocated recurring uplink transmission resources, wherein the allocated recurring uplink transmission resources are grouped with N occasions in each of a repeating period P, and a number of repetitions K to be used for the uplink transmission of transport blocks in the recurring uplink transmission resources; transmitting repetitions of a transport block within a single one of the periods P, each repetition being transmitted on an occasion of the N occasions in the period P; if the number of transmitted repetitions is less than K transmitting, with the transport block, an indication that explicit HARQ feedback is required for the transport block.

The indication that explicit HARQ feedback is required may be punctured within the transport block.

The indication that explicit HARQ feedback is required may be superimposed over selected elements of the transport block.

Explicit HARQ feedback may be requested based on an indication of channel quality being below a predefined threshold.

The indication that explicit HARQ feedback is required may only be transmitted if the number of transmitted repetitions is less than a predefined threshold.

The predefined threshold may be defined relative to K.

There is also provided a method for uplink transmission on configured grant resources in a cellular wireless communications network, the method performed at a UE and comprising the steps of receiving an indication of allocated recurring uplink transmission resources, wherein the allocated recurring uplink transmission resources are grouped with N occasions in each of a repeating period P, and a number of repetitions K to be used for the uplink transmission of transport blocks in the recurring uplink transmission resources; transmitting repetitions of a transport block within a single one of the periods P, each repetition being transmitted on an occasion of the N occasions in the period P; if the number of transmitted repetitions is less than K transmitting a scheduling request relating to the transport block.

The scheduling request may be transmitted on PUSCH resources.

The scheduling request may be transmitted on PUCCH resources.

The method may further comprise the step of if the number of transmitted repetitions is K and channel quality is estimated to be poor, transmitting a scheduling request relating to the transport block.

The scheduling request may only be transmitted if the number of transmitted repetitions is less than a predefined threshold.

The predefined threshold may be defined relative to K.

The scheduling request may only be transmitted if the channel quality is estimated to be below a predefined threshold.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 3:
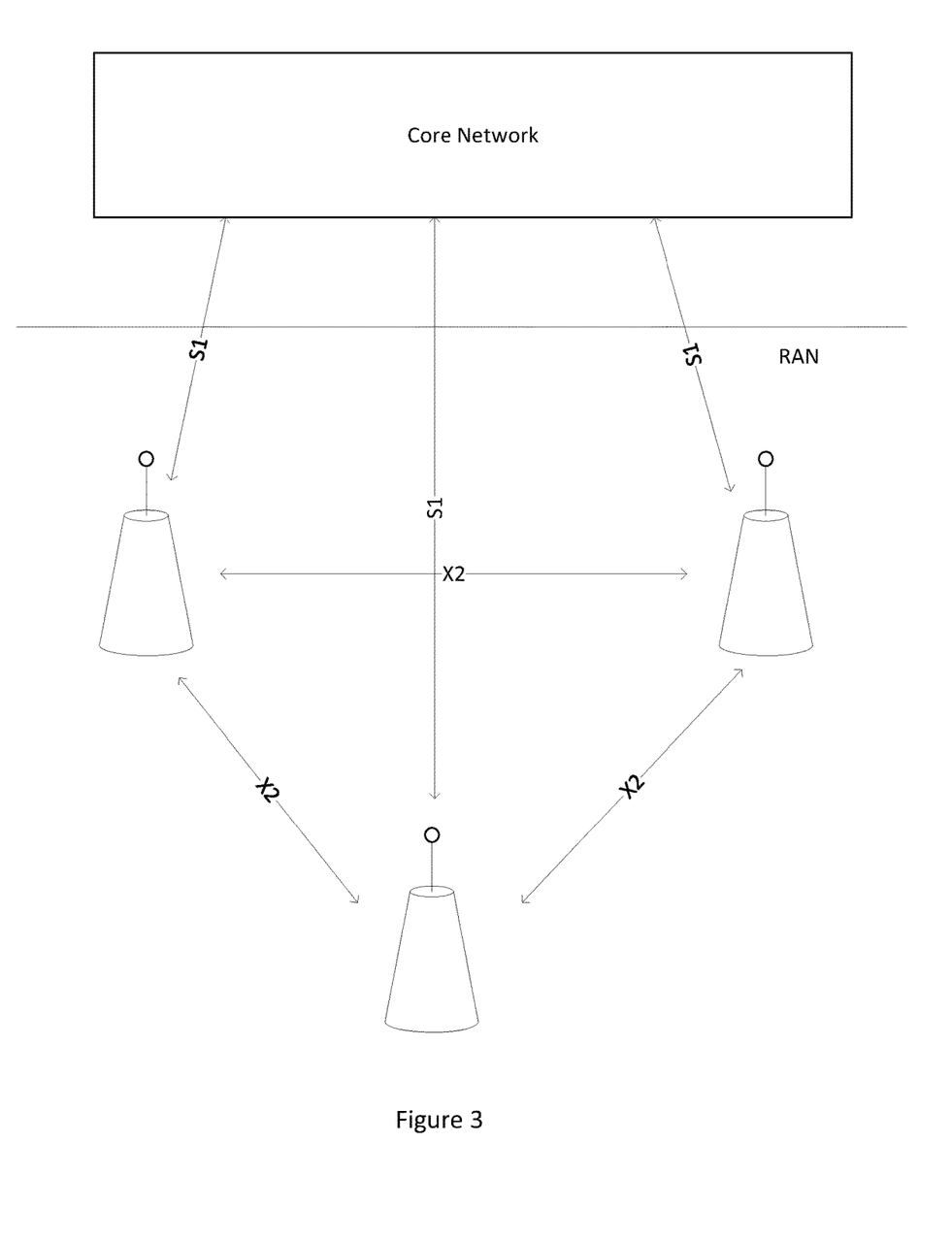
FIG. 3 shows a schematic diagram of parts of a cellular network.

FIG. 3 shows a schematic diagram of three base stations (for example, eNB or gNBs depending on the particular cellular standard and terminology) forming a cellular network. Typically, each of the base stations will be deployed by one cellular network operator to provide geographic coverage for UEs in the area. The base stations form a Radio Area Network (RAN). Each base station provides wireless coverage for UEs in its area or cell. The base stations are interconnected via the X2 interface and are connected to the core network via the S1 interface. As will be appreciated only basic details are shown for the purposes of exemplifying the key features of a cellular network.

The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data.

In the following disclosure the term "eMBB UE" will be used to describe a UE utilising an eMBB-type service (a service with an emphasis on capacity rather than latency and reliability), and "URLLC UE" will be used to describe a UE utilising a URLLC-type service (a service with an emphasis on latency and reliability rather than capacity). This does not suggest the UEs are different and only able to operate with those services, but only that they are using those services at the time under discussion.

Figure 4:
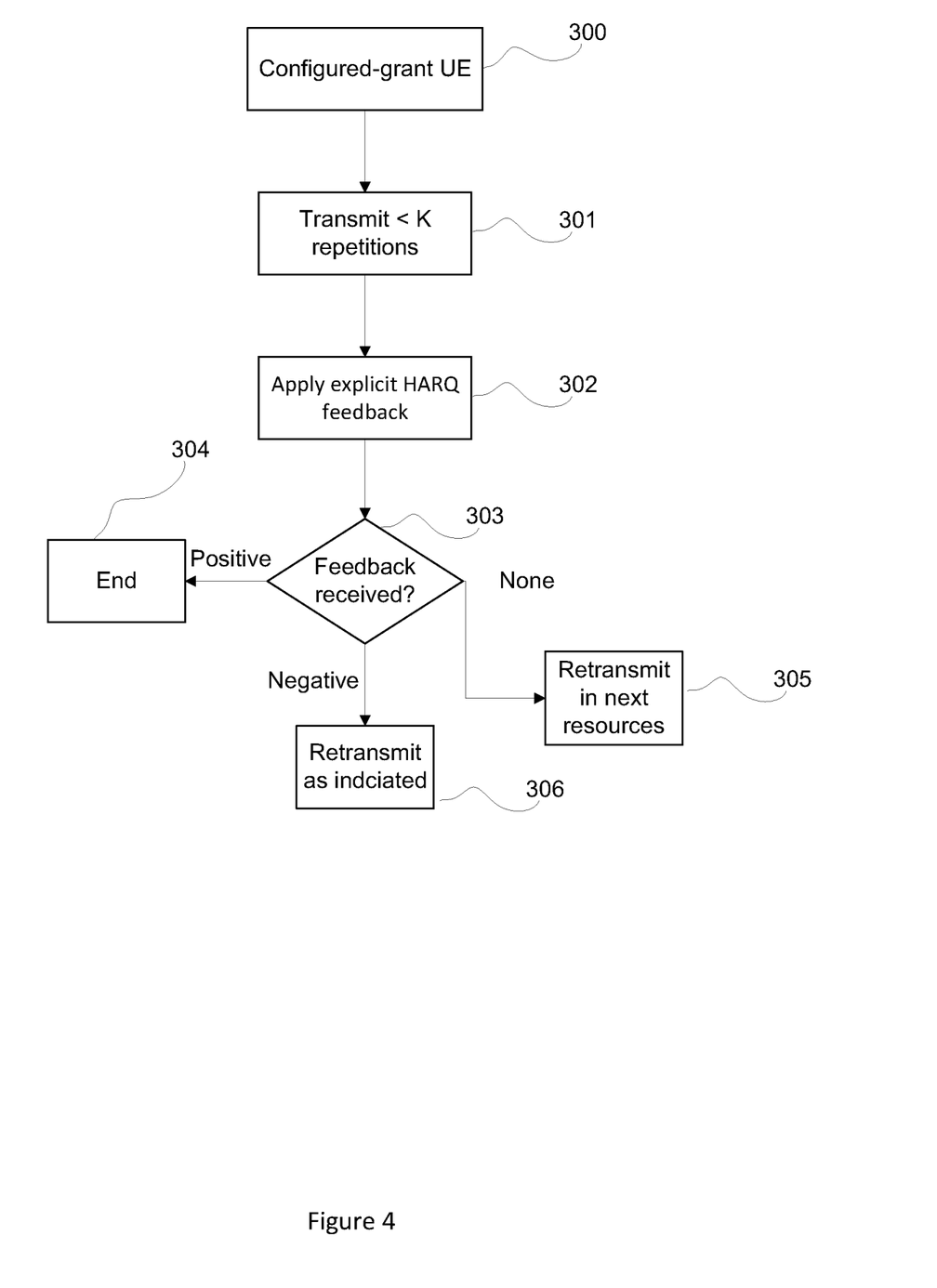
FIGS. 4 to 6 show a flow chart of a method of uplink transmission.

Set out below are methods and systems which seek to provide improved performance for transmission of repetitions of transport blocks when the UE is not able to transmit the configured number of repetitions while maintaining control overhead efficiency and ensuring appropriate latency. FIG. 4 shows a transmission process utilising variable HARQ configurations which seek to achieve this aim.

At step 300 a UE has been allocated configured-grant transmission resources and is free to transmit within those resources when desired. The resources may actually be configured for more than one UE, and the term "a UE" should be construed accordingly. The resources are configured for transmission of K repetitions of each transport block and are arranged in periods of N occasions. In a default configuration the UE applies a timer-based HARQ approach in which the UE assumes transmissions are received unless a feedback signal is received indicating a failure.

At step 301 the UE makes an uplink transmission on the configured-grant resources but is only able to transmit fewer than K repetitions.

Due to the transmission of fewer than K repetitions, at step 302 the UE applies an explicit HARQ feedback process in which the UE waits for an ACK for the transmission before considering the transmission received by the base station.

At step 303 the UE waits for HARQ feedback, and if a positive response is received ends the transmission process at block 304. The positive HARQ feedback may be a UL grant (DCI) may be used for the explicit HARQ feedback. This DCI can be sent with a user specific CS-RNTI which is used with configured grant-based transmissions. For a successful reception the UL grant uses the same HARQ process number (HARQ ID) as the successfully received transport block, and the UE upon receiving this UL grant would know that this is in fact not a re-transmission request but an explicit ACK for the previously transmitted transport block. The new-data-indicator (NDI) field may be set to zero to provide further certainty. Also, some of the fields in the DCI which are actually not needed, such as the time and frequency resource assignment fields, may be sent with predefined values which are specified to be used in an ACK indication.

If no HARQ feedback is received within a predefined time the UE assumes the transmission was not received and retransmits the transport block at block 305. For example, the UE may use the next available configured grant resources, or use specific resources allocated for retransmissions. The situation of step 305 will arise if the base station cannot identify the UE which made a transmission (for example the transmission is not received at all or is so corrupted even the UE's identity cannot be ascertained). For example, the channel conditions (loss, interference, or too few repetitions) may be so bad that even the DMRS cannot be detected. Also, if the base station fails to decode the data, it can decide to not send NAK or UL grant, as it knows that the absence of a HARQ response at the UE will trigger a re-transmission. Thus, in this case, the base station can decide to not send anything saving control signalling, counting on the automatic re-transmission procedure in place. This may be beneficial for example when the configuration and application are such that the latency/reliability targets can suitably be met with the automatic retransmission.

If negative HARQ feedback is received the UE retransmits the transport block at step 306. Such a situation arises if the base station can identify the UE (for example from a DMRS sequence) but cannot decode the data. The negative HARQ feedback may be an uplink control information (UCI) message including the HARQ ID for the failed transmission, and an indication of resources to use for the retransmission. Alternatively, other methods may be used to indicate a failed reception, for example a message of the HARQ ID which implicitly indicates a failed reception and request to retransmit.

In the method of FIG. 4, the base station is aware of the number of repetitions the UE is configured to transmit, and hence can identify a transmission of fewer than the expected number of repetitions. The base station can thus activate the explicit HARQ feedback process to transmit the required feedback depending on the outcome of decoding a received transmission. If a transmission is received with fewer than the expected repetitions the base station still attempts to decode the transmission as the received repetitions may be sufficient to correctly decode the transmission in which case no problem arises. If decoding is successful positive HARQ feedback is sent, but if decoding is not successful negative HARQ feedback is sent. The base station may allocate specific resources for a retransmission and may indicate those in the negative HARQ feedback message. As described earlier, the base station can decide not to transmit any feedback (UL grant) to have an automatic retransmission from the UE for the same transport block.

The process of FIG. 4 thus enables an efficient timer-based HARQ process to be utilised where the configured number of repetitions are not transmitted by the user in the configured grant based UL transmissions to provide the desired reliability level within the latency target.

Figure 5:
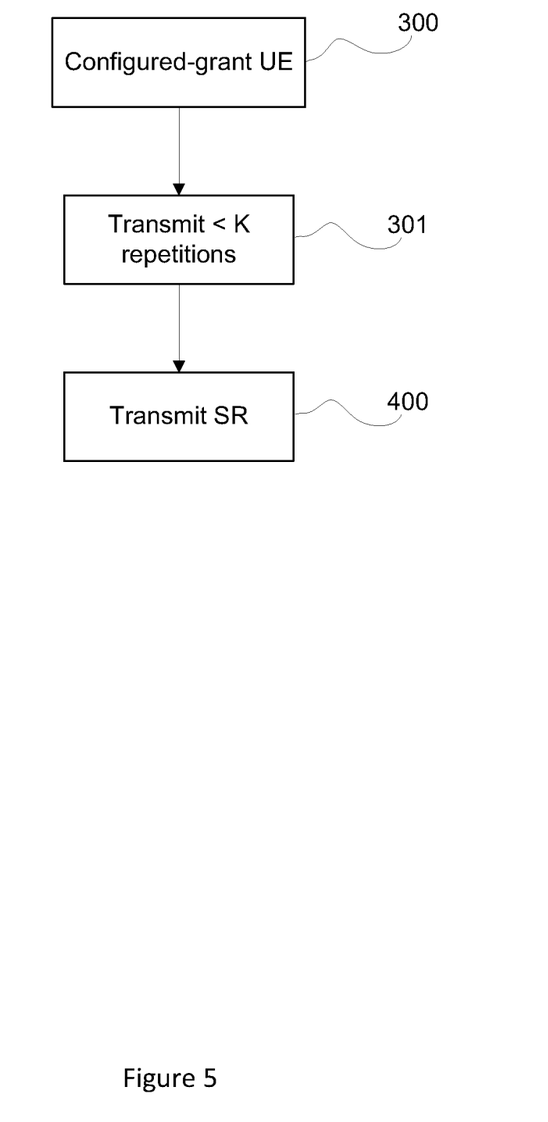

FIG. 5 shows a variation of the method of FIG. 4 with steps which are the same utilising consistent reference numerals.

At step 400 the UE, recognising that fewer than K repetitions are transmitted, also transmits a Scheduling Request (SR). The SR may provide a further means, with an additional diversity mechanism, for the base station to react to a transmission. SR decoding is simple, and the signals provide a more reliable transmission than data transmission, as it is a single bit transmission in the form of a sequence. SR messages may thus provide a more reliable way of detecting a transmission at the base station, particularly where the number of repetitions is less than the configured number. The base station may thus detect the SR from UE, and use it to improve decoding prospects for the transport block. If the base station fails to detect the transport block but detects the SR, it knows that this UE should be scheduled for UL transmission. To further suit the application, the SR in the case of less-than-K repetitions can be different than the conventional SR. This can be achieved either by assigning different SR resource, different SR sequence or by adding an indication in the SR. Thus, in this case, the base station would know precisely that it has missed the UE detection and it can schedule this UE with priority to meet its latency-reliability target.

The SR may be transmitted at the same time as the data in the configured grant resources, or in proximity thereto, depending on the relative timing of SR and configured grant resources. SRs are usually transmitted on the PUCCH but simultaneous transmission of PUSCH and PUCCH may not be permitted. In such a case the SR may be transmitted in a UCI on PUSCH using the configured grant resources together with transmission of the data. If a UE is not transmitting PUSCH, it may transmit a UCI (carrying SR, ACK/NAK for DL Data, CSI reports etc) on PUCCH. However, as PUCCH resources are dedicated resources on different frequency PRBs and OFDM symbols, this provides additional diversity advantage to the SR transmitted in these resources compared to multiplexing and transmitting it over UL configured grant resources along with the data. Thus it could be beneficial to transmit SR on dedicated PUCCH resources when the UE is transmitting the transport block over the configured grant resources. The base station will recognise that a PUCCH and a PUSCH received from the same UE are in relation to the same transport block sent on PUSCH for which the UE could make less than K repetitions.

The following table summarises the options made available by the transmission of an SR as described above.

| Case | PUSCH (Config Grant) | SR in PUCCH | BS Understanding | BS Action | UE Action |
|---|---|---|---|---|---|
| 1 | Correct decoding at BS | Correctly received at BS | BS knows that SR is for the decoded TB. | Indicate correct detection (e.g. using UL grant with same HARQ ID). | Discard the data upon receiving the BS indication. |
| 2 | Correct decoding at BS | Incorrectly decoded at BS | BS upon correctly decoding the data and seeing less than K rep., knows about missing SR. This case should be rare as SR is sent with strong coding. | Indicate correct detection (e.g. using UL grant with same HARQ ID). | Discard the data upon BS indication. |
| 3 | Incorrectly decoding at BS but UE Identified through DMRS | Correctly received at BS | BS understands that UE sent SR along with the TB that it failed to decoded. | BS sends the UL grant for re-transmission. | UE follows the UL grant for re-transmission. |
| 4 | Incorrect decoding and UE Identification Failure at BS | Correctly received at BS | BS completely misses the CG transmission due to failure in UE identification but it receives SR. From the timing of SR and CG configurations, BS knows its decoding failure. | BS sends the UL grant for transmission | UE follows the UL grant for transmission and re-transmits the data. |
| 5 | Incorrectly decoding at BS but UE Identified through DMRS | Incorrect decoding at BS | BS identifies the UE from PUSCH. If it is able to identify the case of less than K repetitions, it knows also about SR detection failure. | BS sends the UL grant for re-transmission | UE follows the UL grant for re-transmission. |
| 6 | Incorrect decoded at BS | Incorrect decoding at BS | BS has no indication about UE transmission. | Nothing | The UE can be configured to i. re-transmit in the subsequent CG resources. ii. retransmit SR |

If a UE is transmitting different types of traffic at the same time, the base station may not be able to relate an SR to the transmitted transport block. The SR may be modified to differentiate the signal from a standalone SR which is sent to the base station to requires scheduling of resources for a forthcoming transmission. For example, the SR can comprise a field which indicates that this SR is for a transport block being transmitted. Another strategy may be to indicate the HARQ ID of the transmitted transport block in the SR. The HARQ ID can be used to relate the SR to the transport block.

Although a UE is typically configured with configured grant transmission parameters to ensure required reliability target, it is possible that data detection suffers due to number of reasons and degrades reliability, for example near the cell boundary or when large interference occurs. A UE may thus be configured to send an SR in parallel on PUCCH with an UL transmission, even if all repetitions are transmitted. The configuration may be indicated by higher layer signalling (RRC) from the base station. The UE can be configured with certain metrics, like DL SINR, or the threshold for the received interference, which may be used as criterion for the UE to send an SR in parallel to UL transmission of a configured grant UL transmission. Similarly, UEs may also be configured to request explicit HARQ feedback in certain situations even if all repetitions are transmitted. In such situation, the user needs to send the indication with the transport block requesting the use of explicit HARQ feedback.

In a different variation of the proposed scheme to improve the reliability and reduce the control overhead in case of transmission of less than K repetitions, the explicit HARQ feedback strategy or the transmission of SR in parallel to the transport block is adopted only under additional restrictions. One example is when the number of repetitions actually transmitted is below a certain threshold K1 where K1<K. For example, K1 can be half of K, i.e., K1=K/2. In another variation, the explicit HARQ feedback strategy or the transmission of SR are only adopted as a function of a pre-defined channel quality metric at the user. As an example, when the user transmits less than K repetitions, and has poor channel quality, it adopts explicit HARQ or parallel SR transmission. On the contrary, if the user has a very good SINR, considering the reciprocal channel quality to be the same, the additional diversity mechanisms like explicit HARQ or SR may not be needed as the base station may be able to decode the transport block even with less than K repetitions. The advantage of such schemes is that they reduce the overhead of the associated control signalling but still getting activated in poor decoding situations when they are mostly needed.

The option to send an SR or request explicit HARQ feedback may be selected depending on a range of metrics. For example a DL channel quality metric can be utilised and if the UE's metric falls below a threshold, SR transmission or explicit HARQ feedback may be activated. For example, the SINR of the synchronization sequence block (SSB) may be used. In another example, received signal power when the base station mutes certain resource elements can provide an indication of interference.

To provide further flexibility a system (e.g. UE or base station) may be permitted to select between explicit HARQ feedback structure or sending an SR in parallel to the transmission of the transport block, when they are able to make less than K repetitions. The base station may define the configuration which is transmitted to relevant UEs in an appropriate signalling scheme. Alternatively, UEs may be configured to select a particular scheme.

To configure explicit HARQ feedback, an indicator may be transmitted with the transport block to request explicit HARQ feedback, for example an indicator may be set in a predefined resource element of the transport block. The data resource elements may be punctured to include the indication, or the indication can be superimposed on the data resource elements at predefined locations which may lead to less degradation of data transmission. If a UE chooses to transmit SR in parallel to the transmission of the transport block no explicit feedback is triggered as the indicator is not present. This may be advantageous when there is at least a suitable SR transmission occasion available where a UE can transmit an SR for the transport block in question. In the contrary situation, if a UE doesn't have resources to transmit an SR in parallel to the transmission of the transport bloc, the UE ay send an indication to trigger explicit HARQ feedback.

It is also possible that both explicit HARQ feedback, and transmission of an SR, are used together for one transmission to maximise the reliability within a short time interval when the UE has to transmit fewer than K repetitions.

Figure 6:
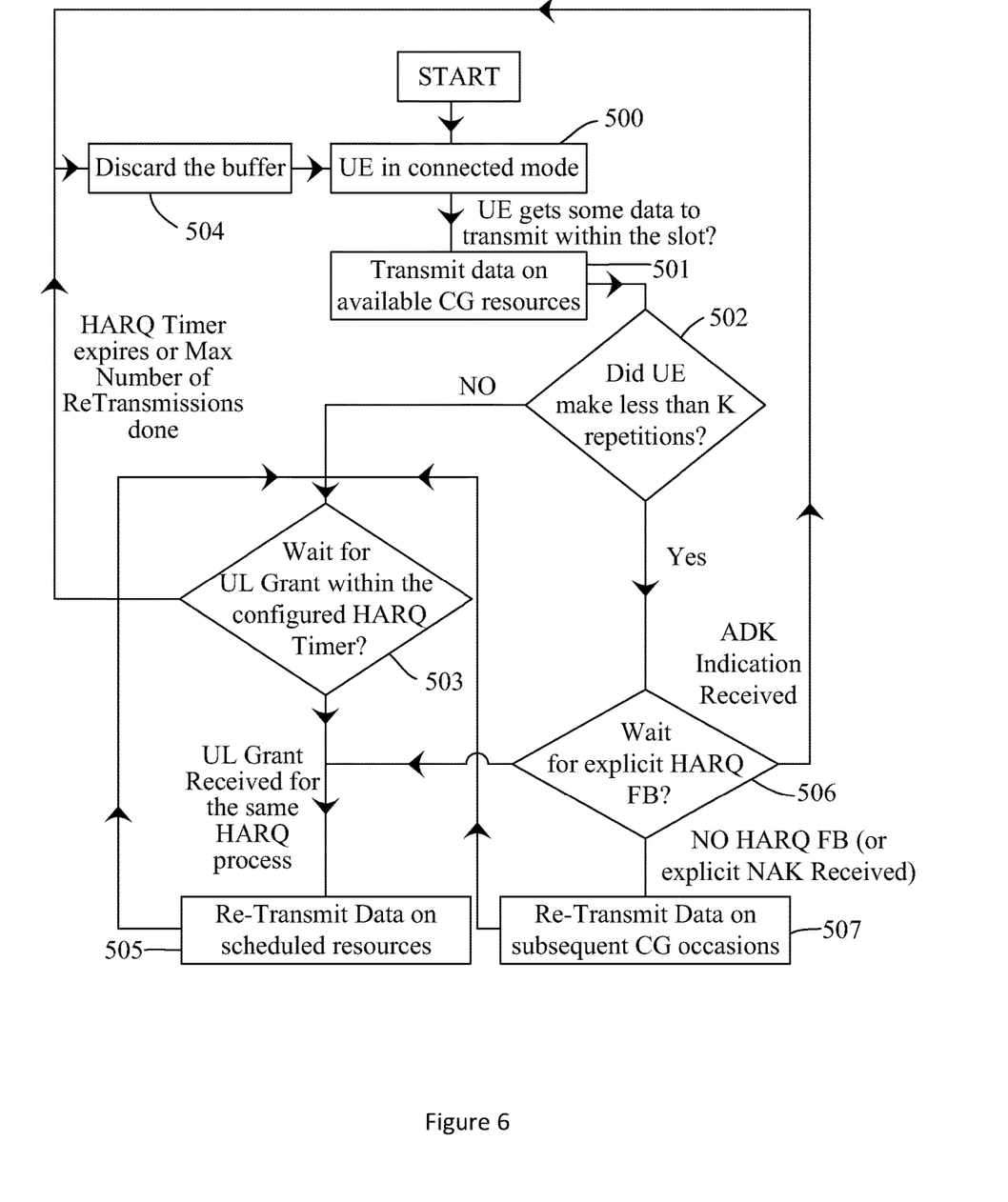

FIG. 6 shows a more detailed flow chart of a method utilising features of the current disclosure. At block 500 a configured grant UE is in connected mode, and at block 501 transmits data on the configured grant resources. At block 502 the UE assesses the number of repetitions transmitted against the expected number, K.

If K repetitions were successfully transmitted at block 502 the UE waits at block 503 for the defined HARQ period. If the HARQ timer expires without an UL Grant message (or other indication of failed reception) the UE assumes the data was received and discards the buffer at block 504 before returning to block 500. If at block 503 an indication of failed reception is received the UE retransmits the data on the indicated resources (or pre-defined resources such as the next occurrence of the configured grant resources) at block 505. The UE returns to block 503 and waits for the HARQ timer, or if the maximum number of retransmissions have been performed the UE moves to block 504 and then block 500.

If fewer than K repetitions were transmitted, the UE moves from block 502 to block 506 where the UE waits for explicit HARQ feedback. If positive HARQ feedback is received the UE proceeds to discard the buffer at block 504 and returns to block 500.

If no explicit HARQ feedback is received, or an explicit NAK is received, the UE moves to block 507 to retransmit the data at a subsequent opportunity (for example the next available configured grant resources), and then moves to block 503 as explained above.

If, at block 506, the UE receives an UL Grant for the HARQ ID used for the initial transmission the UE moves to block 505 to transmit the data on the indicated resources, before proceeding to block 503.

The method of FIG. 5 thus provides a process for efficient transmission while maintaining reliability through a variable HARQ approach.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method for uplink transmission on configured grant resources in a cellular wireless communications network, comprising:
   at a base station, allocating recurring uplink transmission resources to a user equipment (UE), wherein the allocated recurring uplink transmission resources are grouped with N occasions in each of a repeating period P, and defining a number of repetitions K to be used for uplink transmission of transport blocks using the recurring uplink transmission resources;
   transmitting an indication of the allocated recurring uplink transmission resources, including the number of repetitions K, and the N occasions to the UE;
   at the UE, transmitting repetitions of a transport block within a single one of the periods P, each repetition being transmitted on an occasion of the N occasions in the period P;
   at the UE, 4 when the number of transmitted repetitions is less than K, applying an explicit Hybrid Automatic Repeat Request (HARQ) feedback process, and when the number of successfully transmitted repetitions is K, applying a HARQ timer-based HARQ process, in which the UE waits for a HARQ period, and when the HARQ timer expires without receiving an UL Grant message, the UE does not retransmit the transport block, and when an indication of a failed reception is received, the UE retransmits the transport block on the indicated resources; and
   at the base station:
      when the number of received repetitions is less than K, and the transport block is successfully decoded, transmitting a positive HARQ acknowledgment;
      when the number of received repetitions is less than K, the transport block is not successfully decoded, and the UE can be identified, transmitting a negative HARQ indication; and
      when the number of received repetitions is K, and the transport block is successfully decoded, not transmitting a positive HARQ acknowledgement; and
      when the number of received repetitions is K, and the transport block is not successfully decoded, transmitting an UL grant for re-transmission.

2. The method according to claim 1, wherein the negative HARQ acknowledgement is an UL grant indicating resources to be used for a retransmission of the transport block.

3. The method according to claim 2, further comprising retransmitting the transport block from the UE to the base station using the indicated resources.

4. The method according to claim 1, wherein the negative HARQ acknowledgement includes the HARQ ID of the transport block.

5. The method according to claim 1, wherein the negative HARQ indication is only transmitted if the number of transmitted repetitions is less than a predefined threshold, wherein optionally the predefined threshold is defined relative to K.

6. The method according to claim 1, wherein the negative HARQ indication is only transmitted if the channel quality is estimated to be below a predefined threshold.

7. The method according to claim 1, wherein when less than K repetitions were transmitted, and no explicit HARQ feedback is received, retransmitting the transport block on subsequent configured grant resources.

8. The method according to claim 1, wherein when less than K repetitions were transmitted, and a negative HARO feedback is received, retransmitting the transport block on transmission resources indicated in the negative HARQ feedback.

9. The method according to claim 1, wherein the explicit HARQ feedback process is only applied when the number of transmitted repetitions is less than a predefined threshold, wherein optionally the predefined threshold is defined relative to K.

10. The method according to claim 1, wherein the explicit HARO feedback process is only applied if the channel quality is estimated to be below a predefined threshold.

11. A method for uplink transmission on configured grant resources in a cellular wireless communications network, the method performed at a base station and comprising:
   allocating recurring uplink transmission resources to a user equipment (UE), wherein the allocated recurring uplink transmission resources are grouped with N occasions in each of a repeating period P, and defining a number of repetitions K to be used for uplink transmission of transport blocks using the recurring uplink transmission resources;
   transmitting an indication of the allocated recurring uplink transmission resources, including the number of repetitions K, and the N occasions to the UE;
   receiving repetitions of a transport block within a single one of the periods P, each repetition being transmitted on an occasion of the N occasions in the period P;
   when the number of received repetitions is less than K, transmitting feedback associated with an explicit Hybrid Automatic Repeat Request (HARQ) feedback process, and when the number of successfully received repetitions is K, when a HARQ timer expires after a HARQ period without receiving an UL Grant message, not receiving a retransmission of the transport block, and when an indication of a failed reception is transmitted, receiving the retransmission of the transport block on the indicated resources;
   when a number of received repetitions of a transport block is less than K, and the transport block is successfully decoded, transmitting a positive HARO acknowledgment,
   when the number of received repetitions is less than K, the transport block is not successfully decoded, and the UE can be identified, transmitting a negative HARO indication;
   when the number of received repetitions is K, and the transport block is successfully decoded, not transmitting a positive HARO acknowledgement; and
   when the number of received repetitions is K, and the transport block is not successfully decoded, transmitting an UL grant for re-transmission.

12. A method for uplink transmission on configured grant resources in a cellular wireless communications network, the method performed at a user equipment (UE) and comprising:
   receiving an indication of allocated recurring uplink transmission resources, wherein the allocated recurring uplink transmission resources are grouped with N occasions in each of a repeating period P, and receiving a number of repetitions K to be used for uplink transmission of transport blocks using the recurring uplink transmission resources;
   receiving an indication of the allocated recurring uplink transmission resources, including the number of repetitions K, and the N occasions;
   transmitting repetitions of a transport block within a single one of the periods P, each repetition being transmitted on an occasion of the N occasions in the period P;
   when the number of transmitted repetitions is less than K, applying an explicit Hybrid Automatic Repeat Request (HARQ) feedback process, and when the number of successfully transmitted repetitions is K, applying a HARQ timer-based HARQ process, in which the UE waits for a HARQ period, and when the HARQ timer expires without receiving an UL Grant message, the UE does not retransmit the transport block, and when an indication of a failed reception is received, the UE retransmits the transport block on the indicated resources; and
   when the number of received repetitions is less than K, and the transport block is successfully decoded by the base station, receiving a positive HARQ acknowledgment;
   when the number of received repetitions is less than K, the transport block is not successfully decoded by the base station and the UE can be identified by the base station, receiving a negative HARQ indication; and
   when the number of received repetitions is K, and the transport block is successfully decoded by the base station, not receiving a positive HARQ acknowledgement; and
   when the number of received repetitions is K, and the transport block is not successfully decoded by the base station, receiving an UL grant for re-transmission.

13. The method according to claim 12, wherein the indication that explicit HARQ feedback is required is punctured within the transport block, or superimposed over selected elements of the transport block.

14. The method according to claim 13, wherein explicit HARQ feedback is requested based on an indication of channel quality being below a predefined threshold.

15. The method according to claim 12, wherein the indication that explicit HARQ feedback is required is only transmitted if the number of transmitted repetitions is less than a predefined threshold, wherein optionally the predefined threshold is defined relative to K.

16. The method of claim 12, further comprising:
   when the number of transmitted repetitions is less than K transmitting a scheduling request relating to the transport block.

17. The method according to claim 16, wherein the scheduling request is transmitted on PUSCH resources or PUCCH resources.

18. The method according to claim 16, further comprising, when the number of transmitted repetitions is K and channel quality is estimated to be poor, transmitting a scheduling request relating to the transport block.

19. The method according to claim 16, wherein the scheduling request is only transmitted when the number of transmitted repetitions is less than a predefined threshold, wherein optionally the predefined threshold is defined relative to K.

20. The method according to claim 16, wherein the scheduling request is only transmitted when the channel quality is estimated to be below a predefined threshold.

* * * * *